D. WORTHEN.
Alcohol Still.
No. 107,645.  Patented Sept. 20, 1870.
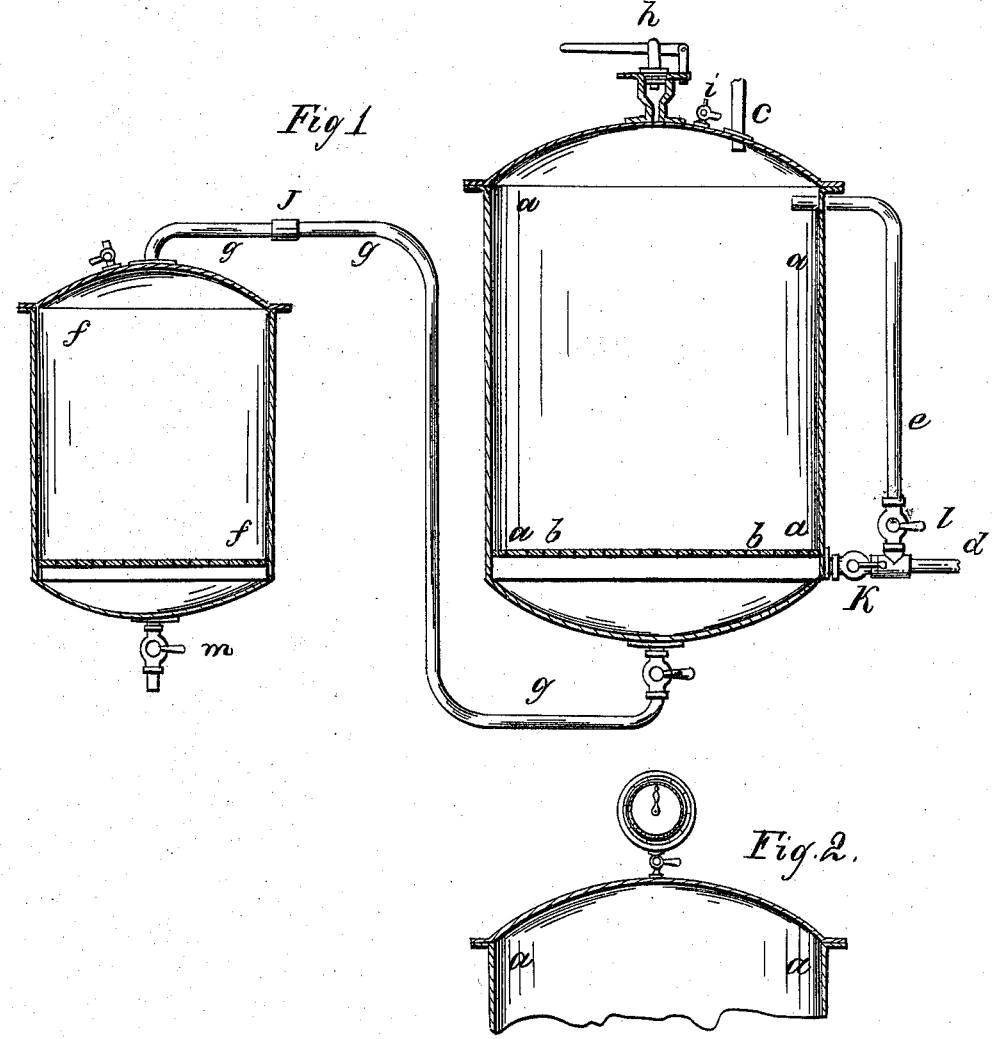

UNITED STATES PATENT OFFICE.

DANIEL WORTHEN, OF BROOKLYN, NEW YORK.

IMPROVEMENT IN RECTIFYING AND IMPROVING ALCOHOLIC SPIRITS.

Specification forming part of Letters Patent No. 107,645, dated September 20, 1870.

Be it known that I, DANIEL WORTHEN, of the city of Brooklyn, county of Kings and State of New York, have invented a new and valuable Apparatus for Rectifying and Improving Whisky and other Alcoholic Liquors; and I hereby declare that the following is a full, clear, and exact description of the construction and operation thereof, reference being had to the accompanying drawing, and to the letters and figures thereon.

Figure 1 represents a vertical section of my apparatus, which may be made of copper or any other suitable material, and of any convenient form or size.

The letter $a$ represents a tank or cistern, which I call a "purifying-tank." $b$ represents a perforated plate or diaphragm, fitted into the tank about three inches above the bottom, the perforations being about half an inch in diameter and about three inches apart. $c$ represents a feed-pipe, by means of which the tank is charged with the liquor to be treated. $d$ represents the discharge-pipe of a blowing apparatus, the end of which enters the purifying-tank below the diaphragm. $e$ represents a branch pipe connected with the aforesaid discharge-pipe, the upper end of which enters the purifying-tank near the top. $f$ represents a charcoal filter, constructed substantially as they usually are for rectifying whisky, but of much greater strength. $g$ represents a connecting-pipe, extending from the bottom of the purifying-tank to the top of the filter. $h$ represents a safety-valve, mounted on the top of the tank, and $i$ a blow-off cock, through which the air escapes from the tank as the liquor is passed in. $j$ represents a union-joint in the connecting-pipe $g$, by means of which the operator can disconnect and remove the cover of the filter at his will.

Fig. 2 represents a transverse section of the purifying-tank, with a pressure-gage mounted on top of it, which may be used as a substitute for the safety-valve or in connection with it.

The apparatus, when thus constructed and connected with the air pump or blower, is ready for operation, and the purifying-tank is then charged with the liquor to be treated, care being taken that the charge be not so great as to fill it more than about three-fourths full, thus leaving a vacant space or chamber in the top or upper end of it. The blowing apparatus is then put in operation and a strong current of air forced into the tank and up through the liquor into the vacant chamber at the top. The operation of the blower is continued until the pressure of air in the chamber amounts to about eighty (80) pounds to the inch. The blower is then stopped and the compressed air allowed to remain in the chamber about twenty minutes, during which time the vapor of alcohol, with which the air becomes saturated in its passage up through the liquor, condenses and returns to its liquid state, the condensation being effected by compression. The blow-off cock is then opened and the air allowed to pass out.

This operation may be repeated, should it be required, to effect a thorough exposure of the liquor to the air.

This part of the treatment completed, the liquor is then forced into the filter through the connecting-pipe $g$, which is accomplished by closing the stop-cock $k$ and opening the one marked $l$, and thus transferring the blast of air from the bottom of the purifying-tank to the top, and forcing the liquor by pneumatic pressure down through the charcoal, and discharging it from the filter through the cock $m$.

It has long been known to chemists that fusel-oil, when mixed with whisky or other alcoholic liquids, can be oxidized and made perfectly innoxious by exposing such liquors to the action of atmospheric air; but the loss of alcohol by evaporation, which has resulted from the methods of exposure heretofore tried, has been so great as to render them of little or no practical utility.

By the use of my apparatus and method of treatment little or no loss is sustained.

What I claim as my invention, and wish to secure by Letters Patent, is—

1. The purifying-tank herein described, composed of the chamber $a$, perforated bottom $b$, and the several pipes and connections, so as to first aerate the liquid with compressed air, and then discharge it, as set forth.

2. The mode herein described for treating alcoholic liquors, the same consisting in passing through the liquor streams of compressed air, substantially as described.

3. The mode herein described for removing vapors from air used in treating alcoholic spirits, consisting in retaining the air charged with vapor under pressure, so as to separate and condense the vapor, as described.

4. The combination of the vessels $a$ and $f$, by means of pipe $g$, as and for the purpose described.

DANIEL WORTHEN.

Witnesses:
L. P. WHITEHEAD,
C. C. LIVINGS.